United States Patent [19]

Wesley et al.

[11] Patent Number: 5,641,890

[45] Date of Patent: *Jun. 24, 1997

[54] GELLED ORGANIC LIQUIDS

[75] Inventors: John N. Wesley, Edison; Amjad Farooq, Somerset; Ammanuel Mehreteab, Piscataway; Francis T. Barbato, Milford, all of N.J.

[73] Assignee: Colgate-Palmolive Company, New York, N.Y.

[*] Notice: The portion of the term of this patent subsequent to Aug. 19, 2014, has been disclaimed.

[21] Appl. No.: 177,785

[22] Filed: Jan. 5, 1994

Related U.S. Application Data

[62] Division of Ser. No. 916,457, Jul. 20, 1992, abandoned.

[51] Int. Cl.$^6$ .................. B01J 13/00; C01L 7/02; C01L 7/04
[52] U.S. Cl. ............... 44/266; 44/271; 252/314; 252/315.4; 252/315.7; 510/403; 510/476
[58] Field of Search ............ 252/315.4, 315.6, 252/315.7, 314, 174.24; 44/266, 271, 272; 524/437, 916; 526/932; 510/403, 476

[56] References Cited

U.S. PATENT DOCUMENTS

| | | | |
|---|---|---|---|
| 1,523,580 | 1/1925 | Calvert | 44/272 |
| 2,443,378 | 6/1948 | Dittmar et al. | 44/271 |
| 2,769,697 | 11/1956 | Goldenson et al. | 252/315.7 X |
| 3,148,958 | 9/1964 | Monick | 44/271 |
| 3,964,880 | 6/1976 | Siegrist | 44/267 |
| 4,084,939 | 4/1978 | Zmoda | 44/271 |
| 4,205,103 | 5/1980 | Davis et al. | 252/315.4 X |
| 4,365,971 | 12/1982 | Monick | 44/266 |
| 4,816,182 | 3/1989 | Novich et al. | 252/313.1 |
| 4,836,948 | 6/1989 | Corring | 252/174.24 X |
| 4,904,411 | 2/1990 | Novich et al. | 252/309 |
| 4,956,170 | 9/1990 | Lee | 252/315.4 X |
| 5,053,158 | 10/1991 | Dixit et al. | 510/223 |

FOREIGN PATENT DOCUMENTS

| | | |
|---|---|---|
| 2278755 | 2/1976 | France . |
| 1251002 | 10/1971 | United Kingdom . |
| 2009782 | 6/1979 | United Kingdom . |

OTHER PUBLICATIONS

BF Goodrich "Personal Care Products" Carbopol ®Resins (1968) pp. 1–27.

*Primary Examiner*—Richard D. Lovering
*Attorney, Agent, or Firm*—Michael McGreal

[57] ABSTRACT

Organic liquids can be very effectively gelled by using in combination with an amine neutralized anionic polymer an auxiliary rheological additive. The auxiliary rheological additive is a substance which increases the linearity of the anionic polymer and its thixotropic properties. Suitable auxiliary rheological additives are amphoteric oxides and/or fatty acids and/or fatty acid salts. The organic liquids that can be effectively gelled are organic solvents which include fuels such as hydrocarbons and alcohols.

20 Claims, No Drawings

GELLED ORGANIC LIQUIDS

This application is a divisional of application Ser. No. 7/916,457, filed Jul. 20, 1992, and now abandoned.

This invention relates to gelled organic liquids where the structure of the organic liquids have been changed from free flowing liquids to liquids that do not flow and are considered solids under ASTM D4359-84. More particularly, this invention relates to organic liquids that can De used as fuels that are gelled to the extent that they are considered to be solids under ASTM D4359-84.

There is a need in many products to substantially increase the viscosity of organic liquids and these organic liquids may be in a mixture with water. It is easier to apply an organic liquid to a surface in a thickened condition rather than as a free flowing liquid. This is particularly the case with vertical surfaces. Products that are usefully thickened include organic based paints, paint and corrosion removers, nail polish removers, lotions, creams, salves, shampoos, household and commercial cleaners, oil drilling fluids, fuels and charcoal lighter fluids. There are yet many other uses for thickened organic liquids. When the organic liquid is gelled, it will also have a significantly reduced rate of evaporation. Due to a substantially decreased rate of evaporation the effectiveness of the organic liquid is increased.

A particularly useful area for gelled organic liquids is in gelled fuels. These can be fuels for stationary or mobile use. Gelled fuels in transport vehicles reduce the risk of fire in an accident. These gelled fuels can be used for autos, trucks, buses, boats and aircraft. This can be gelled gasoline or diesel fuel. In addition, the gelled fuels can be used as stationary sources of heat such as for cooking. A fuel of choice for such a use is an alcohol, usually methanol or ethanol, but can also be a propanol, butanol, pentanol or hexanol. Both methanol and ethanol are commonly used fuels for cooking. The gelled methanol or ethanol in one use is in a container that has a capacity of about 200 to 500 ml. This container is placed under a chafing dish and ignited to keep the food contents of the chafing dish warm. These containers will burn from about 2 to 5 hours depending on the volume of the fuel in the container.

Fuels to be effectively used without a wick to deliver the fuel to a burn surface must be gelled. Further, these fuels should be gelled so that they are classified as solids under ASTM D4359-84. The fuel must not separate from the gel on standing or upon the application of pressure. The primary reason is safety. If a gelled fuel is classified as a solid under ASTM D4359-84 it will be subject to less vigorous regulations for transport and storage.

A commonly used gelling agent for commercially available fuels such as methanol or ethanol is nitrocellulose. The nitrocellulose holds the fuel in a sponge-like matrix. However, this is not a true gel. Some of the fuel can be physically separated from the nitrocellulose. The net result is that in a container there can be free fuel present. This is not desirable.

In U.S. Pat. No. 3,759,674 there is disclosed dispersions of certain ethylene-acrylic acid copolymers and amine emulsifiers in water to form stable gels when admixed with alcohols. The dispersions contain from 10 to 20 parts by weight of the ethylene-acrylic acid copolymer and from about 3 to 4 parts by weight of an amine emulsifier. It will be from about 10 to 30 percent by weight solids. In U.S. Pat. No. 3,148,958 there is disclosed the gelling of an alcohol fuel through the use of carboxy vinyl polymers neutralized with a weak amine base. This results in a gelled alcohol fuel that is stated to have good burn characteristics. U.S. Pat. No. 4,261,700 and U.S. Pat. No. 4,365,971 each disclose the use of a Carbopol 934 ethylene acrylic acid copolymer gelling agent for an alcohol fuel. The Carbopol 934 is neutralized to form the gel using a weak amine base. In U.S. Pat. No. 3,214,252 there is disclosed the use of olefin-maleic anhydride copolymers as gelling agents for alcohols. These are gelled by compounds that can supply an hydroxyl group. In U.S. Pat. No. 4,536,188 there is disclosed the incorporation of alcohol-soluble metal compounds into an alcohol fuel to increase the visibility of the otherwise invisible flames. It is also known from U.S. Pat. No. 2,890,257 to add silica gel or activated aluminas to stabilize naptha fuels. These are not gelled fuels. It is also known to gel a range of solvents using amine neutralized polyacrylic acid polymers.

The disclosures of these references are interesting but there is no directions to gel a solvent by the use of an alkaline compound such as an amine neutralized anionic polymer which contains an auxiliary rheological additive to increase the linearity of the anionic polymer. An auxiliary rheological additive is a substance that increases the viscosity of a solution of the amine neutralized anionic polymer. Upon the anionic polymer being dissolved and neutralized there is an increase in anionic polymer linearity. This linearity is further enhanced through the use of an auxiliary rheological additive. It has also been found that when the solvent is a fuel, such as an alcohol fuel, that the use of an agent for the structuring of the polymer, such as an amphoteric metal oxide, and optionally a fatty acid or a salt of a fatty acid, provides for a more effective burning of the fuel. It appears that a solid amphoteric metal oxide decreases the tendency of the burn surface to form a continuous skin seal. When such a skin seal is formed, the fuel has to erupt through the skin to burn. This produces noise and irregular burning. This does not occur when an amphoteric oxide auxiliary rheological additive is used. There is also an improved gel.

BRIEF SUMMARY OF THE INVENTION

The present invention is directed to producing improved gelled solvents, and in particular, organic solvents. The gelled organic solvents include alkanes, alkenes, aromatics, acids, ketones, aldehydes, oils, ethylene glycols, polyethylene glycols, amines, alcohols and esters. The gelled solvents have a wide area of usage. One particular area of usage is as gelled fuels, and in one preferred embodiment as gelled fuels for cooking and heating foods.

The gelled solvents will contain from about 0.1 to 10 weight percent of a base neutralized anionic polymer, 0.1 to 10 weight percent of an auxiliary rheological additive with the balance being at least one solvent, and primarily an organic solvent. The neutralized anionic polymer is preferably an amine neutralized crosslinked anionic polymer such as a crosslinked polyacrylic acid polymer and has a molecular weight of about 60,000 to 10,000,000. The polyacrylic acid polymer is neutralized using an amine base. The presence of an auxiliary theological additive, which serves to further uncoil the anionic polymer and thus increase its linearity, increases the thixotropic properties of the gelled organic solvent. There is an increase in viscosity of from about 10 to 300 percent of the viscosity of a similar gelled solvent which does not contain the auxiliary rheological additive.

DETAILED DESCRIPTION OF THE INVENTION

This invention is directed to gelled solvents, and in particular to gelled organic solvents. The gelled organic solvents can contain some water, but since the organic is predominant it will be considered to be a gelled organic solvent. The water content can range from about 0 to about 45 wt. percent, and in many cases 0.1 to 35 wt. percent of the gelled composition. In a particular embodiment the invention is directed to gelled fuels. The organic fuel component can be an alkane, alkene, alcohol, an aromatic or mixtures of these hydrocarbons. In a preferred embodiment the fuel is an alcohol of from 1 to 6 carbon atoms.

The combination of the base neutralized, and usually amine neutralized, crosslinked anionic polymeric and the auxiliary theological additive results in enhanced thixotropic properties. The auxiliary rheological additive will increase the viscosity of the gelled solvent from about 10 to 300 percent. This is a significant increase for the addition of a relatively small amount of an additive.

The polymer thickening agents and auxiliary rheological additives both contribute to the viscoelastic rheology of the thickened compositions of the instant invention. As used herein, "viscoelastic" or "viscoelasticity" means that the elastic (storage) moduli (G') and the viscous (loss) moduli (G") are both substantially independent of strain, at least in an applied torque range of from 1 to 150 micro N.m (Newton meter). More specifically, a composition is considered to be linear viscoelastic for purposes of this invention, if over the torque range of 1 to 150 micro N.m the elastic moduli G' has a minimum value of at least 2,500 dynes/sq. cm., preferably at least 3,500 dynes/sq.cm., and varies less than 500 dynes/ sq. cm, preferably less than 400 dynes/sq. cm., and especially preferably less than 370 dynes/sq.cm. Typically, the variation in loss moduli G" will be less than that of G'. As a further characteristic of the preferred linear viscoelastic compositions the ratio of G"/G' (tan$\int$) is less than 1, preferably less than 0.4, and more preferably less than 0.2, at least over the torque range of 1 to 150 micro N.m.

By way of further explanation, the elastic (storage) modulus G' is a measure of the energy stored and retrieved when a strain is applied to the composition while viscous (loss) modulus G" is a measure to the amount of energy dissipated as heat when strain is applied. Therefore, a value of tan$\int$, $$0.05 < \tan\int < 1,$$

preferably $$0.2 > \tan\int < 0.8$$

means that the compositions will retain sufficient energy when a stress or strain is applied. The compositions with tan$\int$ values in these ranges, therefore, will also have a high cohesive property, namely, when a shear or strain is applied to a portion of the composition to cause it to flow, the surrounding portions will follow. As a result of this cohesiveness of the subject viscoelastic compositions, the compositions will readily flow uniformly and homogeneously thereby contributing to the physical (phase) stability of the formulation which characterizes the present compositions. The viscoelastic property also contributes to improved physical stability against phase separation of any undissolved suspended particles by providing a resistance to movement of the particles due no the strain exerted by a particle on the surround fluid medium.

A means for further improving the structuring of the gel formulations in order to obtain improved viscosity as well as G' and G" values is to form a solution of an organic solvent, a neutralized crosslinked anionic polymer such as a neutralized crosslinked polyacrylic acid thickening agent by mixing at room temperature to slightly elevated temperature and subsequently with mixing neutralizing the anionic groups such as the carboxylic acid groups by the addition of an excess basic material, such as an organic amine, to form a neutralized crosslinked anionic polymer such as a crosslinked polyacrylic acid polymer having a molecular weight of about 60,000 to 10,000,000. To the solution of the amine neutralized crosslinked anionic polymer is added with mixing an auxiliary rheological additive such as an amphoteric metal oxide which is a colloidal, insoluble particulate such as aluminum oxide and/or a fatty acid and/or a salt of a fatty acid. The neutralized crosslinked anionic polymer such as a crosslinked polyacrylic acid polymer in combination with the auxiliary rheological additive provides improved G' and G" values as well as improved viscosification of the organic polymeric solution which has a pH of about 7 to 14 as compared to the use of the neutralized crosslinked anionic polymer alone. It is theorized that the improvement in viscosification results from an increase in solid content and from the association of the amphoteric metal oxide and the neutralized crosslinked anionic polymer in the organic solvent, wherein an uncoiling of the polymeric chain of the neutralized and crosslinked anionic polymer, such as a polyacrylic acid, occurs which provides a further building of the polymeric structure within the organic solvent. To the solution of the neutralized crosslinked polyacrylic acid polymer, solvent and auxiliary rheological additive can be added various other ingredients to form fuel compositions, an after shave gel, a detergent composition, a hard surface cleaning composition or any of the previously mentioned compositions. Other commercial and industrial compositions can be formed for a variety of applications such as fabric cleaners, shampoos, floor cleaners, cleaning paste, tile cleaners, ointments, oven cleaners, pharmaceutical suspensions, concentrated coal slurries, oil drilling muds, cleaning prespotters and organic solvent based paints. These compositions can be formulated by adding the appropriate chemicals to the polymeric solution of neutralized crosslinked polyacrylic acid polymer, organic solvent, and the auxiliary rheological additive to form the desired composition. The organic solution of organic solvent, neutralized crosslinked anionic polymer such as a polyacrylic acid polymer and the auxiliary rheological additive such as an amphoteric metal oxide has a complex viscosity at room temperature at 10 radians/second of 1 to 1,000 dyne seconds/ sq. cm., more preferably 30 to 800 dyne seconds/sq. cm.. The organic solution comprises 0.1 to 10.0 weight %, more preferably 0.2 to 4.0 weight % of a auxiliary rheological additive, 0.1 to 10.0 weight %, more preferably 0.1 to 5.0 weight % of a base neutralized, crosslinked anionic polymer such as an amine neutralized, crosslinked polyacrylic polymer, and the balance being an organic solvent, mixtures of organic solvents, or mixtures of organic solvents and water wherein the polymeric solution has a G' value of at least 2,500 dynes/sq. cm at a frequency of 10 radians/ second, a G" value of at least 200 dynes/sq. cm. at a frequency of 10 radians/second, a ratio of G"/G' is less than 1 and G' is substantially constant over a torque range of 1 to 150 micro N.m.

If the organic solution has a G' value of a least 80 dynes/sq. cm. at a frequency of 10 radians/second and the G" value is at least 10 dynes/sq. cm. at a frequency of 10 radians/second, wherein G' is substantially constant over a torque range of 1 to 100 micro N.m and a ratio of G"/G' is less than 1 and a yield stress of at least 5 dynes/sq. cm. more preferably 1 to 1200 dynes/sq. cm., the organic solution will be a gel which can function as a suspension medium for a plurality of solid particles, immiscible liquid droplets or gaseous bubbles. The solid particles, liquid droplets or gaseous bubbles can be inorganic, organic or polymeric. The solid material, liquid droplets or gaseous bubbles which are non soluble in the solvent, should not decompose in the solvent or react with the anionic groups of the anionic polymer. The concentration of the solid particles, liquid droplets or gaseous bubbles in the suspension medium is 0.1 to 70 weight percent, more preferably 1 to 50 weight %.

The estimated minimum yield stress of the gel suspension medium which is necessary to suspend each of the solid spherical particles, liquid droplets or gaseous bubbles such that the particles, droplets or bubbles remain suspended for at least seven days in the gel suspension medium is expressed by the equation:

$$\text{minimum yield stress} = \frac{4(\Delta P)gR^3}{3A}$$

wherein R equals the radius of each of the solid particles, liquid droplets and/or gaseous bubbles; g equals the gravitational constant; ΔP equals the difference between the density of the gel suspension medium and the density of each of the solid particles, liquid droplets or gaseous bubbles and A equals the surface area of each of the solid particles, liquid droplets or the gaseous bubbles.

Additionally, by way of explanation, it ms necessary to clearly emphasize that in order to minimize the rate and amount of sedimentation of solid particles that are insoluble in the suspension medium that the suspension medium should exhibit strain independent moduli. For materials that exhibit strain independence of the viscoelastic moduli (G'), these materials tend to exhibit a critical property known as the yield stress which prevents the sedimentation of insoluble particles from the suspension medium. It is also critical in the understanding of the data as presented in this invention that by linear viscoelastic gel it is meant that G' is substantially constant over a torque range of 1 to 150 micro N.m. The minimum estimated yield stress for the gel necessary to suspend each of the spherical particles in the gel such that each particle will not precepitate from the gel is expressed by the formula:

$$\text{minimum yield stress} = \frac{4(\Delta P)gR^3}{3A} \text{ dynes/sq. cm}$$

wherein R equals the radius of each of the solid particle, A equals the surface area of each of the solid particle, g equals the gravitational constant and ΔP equals the difference in density between the gel and the density of each of the solid particles.

Illustrative of amine neutralized anionic polymers contemplated within the scope of the instant invention beside the polyacrylic acid polymers such as the Carbopols are: sulfonated polymers containing a sulfonate functionality as defined in U.S. Pat. Nos. 3,642,728; 4,608,425; 4,619,773; 4,626,285; 4,637,882; 4,640,945; 4,647,603; 4,710,555, 5,730,028; 4,963,032; 4,963,032; 4,970,260 and 4,975,82, wherein these patents are all hereby incorporated by reference, as well as polymers and monomers containing a carboxylic acid functionally as defined in U.S. Pat. Nos. 4,612,332; 4,673,716; 4,694,046; 4,694,058; 4,709,759; 4,734,205; 4,780,517; 4,960,821 and 5,036,136, wherein these patents are all hereby incorporated by reference, as well as copolymers containing a maleic anhydride functionality such as a crosslinked Gantrez provided that there is a sufficient association between the amine neutralized salts of these polymers in the aforementioned patents and the auxiliary rheological additive to create a viscoelastic gel having the G' and G" properties as defined herein.

Exemplary of the cross-linked polyacrylic acid-type thickening agents are the products sold by B.F. Goodrich under their Carbopol trademark, especially Carbopol 941, which is the most ion-insensitive of this class of polymers, and Carbopol 676, Carbopol 940 and Carbopol 934. The Carbopol resins, also known as "Carbomer", are hydrophilic high molecular weight, cross-linked acrylic acid polymers having an average equivalent weight of 76, and the general structure illustrated by the following formula:

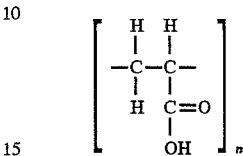

Carbopol 941 has a molecular weight of 1,250,000; Carbopol 940 a molecular weight of approximately 4,000,000 and Carbopol 934 a molecular weight of approximately 3,000,000. The Carbopol resins are cross-linked with polyalkenyl polyether, e.g. 1% of a polyallyl ether of sucrose having an average of 5.8 allyl groups for each molecule of sucrose. Further detailed information on the Carbopol resins is available from B.F. Goodrich, see, for example, the B.F. Goodrich catalog GC-67, Carbopol® Water Soluble Resins.

While favorable results have been achieved with Carbopol 941 polyacrylic resin, other lightly cross-linked polyacrylic acid-type thickening agents can also be used in the compositions of this invention. As used herein "polyacrylic acid-type" refers to homopolymers of acrylic acid or methacrylic acid or copolymers of these acids of their salts, esters or amides with each other or with one or more other ethylenically unsaturated monomers, such as, for example styrene, maleic acid, maleic anhydride, 2-hydroxyethylacrylate, acrylonitrile, vinyl acetate, ethylene, propylene, and the like.

The Carbopol 600 series resin are the most useful in the instant invention. These are salt insensitive, high molecular weight polyacrylic acids which are cross-linked with polyalkenyl ether. In addition to the or branched nature of these resins, they are more highly cross-linked than the 900 series resins and have molecular weights between about 1,000,000 and 4,000,000. Very useful of the Carbopol 600 series resins is Carbopol 614. Carbopol 614 is also highly stable to any anticipated storage temperature conditions from below freezing to elevated temperatures as high as 120° F., preferably 140° F., and especially 160° F., for periods of as long as several days to several weeks or months or longer.

The homopolymers or copolymers are characterized by their high molecular weight, in the range of from 60,000 to 10,000,000, preferably 500,000 to 5,000,000, especially from 1,000,000 to 4,000,000, and by their organic solvent solubility. These thickening agents are used in their lightly cross-linked form wherein the cross-linking may be accomplished by means known in the polymer arts, as by irradiation, or, preferably, by the incorporation into the monomer mixture to be polymerized of known chemical cross-linking monomeric agents, typically polyunsaturated (e.g. diethylenically unsaturated) monomers, such as, for example, divinylbenzene, divinylether of diethylene glycol, N, N'-methylene- bisacrylamide, polyalkenylpolyethers (such as described above, and the like. Typically, amounts of cross-linking agent to be incorporated in the final polymer may range from 0.01 to 1.5 percent, preferably from 0.05 to 1.2 percent, and especially, preferably from 0.1 to 0.9 percent, by weight of cross-linking agent to weight of total polymer. Generally, those skilled in the art will recognize that the degree of cross-linking should be sufficient to impart some coiling of the otherwise generally linear polymeric compound. It is also understood that the water-swelling of the polymer which provides the desired thickening and viscous properties generally depends on one or two mechanisms, namely, conversion of the acid group containing polymers to the corresponding salts, e.g. sodium, generating negative charges along the polymer backbone, thereby causing the coiled molecules to expand and thicken the aqueous solution; or by formation of hydrogen bonds, for example, between the carboxyl groups of the polymer and a hydroxyl donor. The latter mechanism is especially important in the present invention, and therefore, the preferred polyacrylic acid-type thickening agents will contain free carboxylic acid (COOH) groups along the polymer backbone. Also, it will be understood that the degree of cross-linking should not be so high as to render the cross-linked polymer completely insoluble or non-dispersible in water and/or organic solvents or inhibit or prevent the further uncoiling of the polymer molecules in the presence of the amphoteric metal oxide.

The amount of the crosslinked anionic polymer such as a high molecular weight, cross-linked polyacrylic acid or other high molecular weight, hydrophilic cross-linked polyacrylic acid-type thickening agent to impart the desired rheological property of linear viscoelasticity will generally be in the range of from 0.1 to 10%, preferably from 0.1 to 5%, by weight, based on the weight of the composition, although the amount will depend on the particular cross-linking agent, ionic strength of the composition, hydroxyl donors and the like.

The auxiliary rheological additive is a colloidal thickener and is preferably an amphoteric metal oxide which has an average particle size diameter in dispersion of about 0.05 to 2.0 micron, more preferably about 0.05 to about 1.1 microns. Because of their particle size of less than 1 microns these amphoteric metal oxides are non abrasive. The dispersion of the metal oxide contains about 60 to about 90 wt. percent of the metal oxide and the dispersion has a pH of about 3 to about 4. When the acid dispersion of the metal oxide is added to the basic solution of the neutralized anionic polymer, the acidic dispersion of the metal oxide is neutralized thereby making the dispersion of the metal oxide effective as an auxiliary rheological additive. A preferred metal oxide is aluminum oxide. Useful aluminum oxide dispersions are sold by Vista Chemical Company of Houston, Tex. under the tradename Dispal Alumina 23 N4-80, Dispal Alumina 23 N4-20 or Dispal Alumina T23. The auxiliary rheological additive may also contain a fatty acid or a salt of a fatty acid. In addition, a fatty acid or a salt of a fatty acid alone or in combination with the amphoteric which may function as the auxiliary rheological additive.

The anionic crosslinked polymer can be neutralized with an organic amine. The organic amine that can be used to neutralized the anionic polymer can be a primary, secondary or tertiary aliphatic amine, aromatic amine or a heterocyclic amine, wherein the aliphatic amines are especially preferred. For example, in the case of an amine neutralized crosslinked Carbopol polymer, some amines which can be used to neutralize the crosslinked Carbopol polymer are diisopropanolamine, Ethomeen C-25, Di-2 ethylhexyl amine, triethanol amine, triamyl amine, dimethylaminopropionitrile, Alamine, dodecylamine, a copolymer of ethylene/vinyl pyridine and morpholine. Mixed systems of an alkali metal neutralized crosslinked anionic polymer and an amine neutralized crosslinked anionic polymer can at times be employed, wherein the ratio of the metal neutralized polymer to the amine neutralized polymer can be 100/1 to 1/100 and more preferably 10/1 to 1/10. The selection of the neutralizing agent for the anionic polymer is governed, in part by the solvent system of the composition. Typical solvents that can be employed to dissolve the amine neutralized crosslinked anionic polymers and which are consequently gelled are illustrated in Table I. The gelling is with the use of the above enumerated amines.

TABLE I

| % Solvent A<br>% Solvent B | (1) | (2) | (3) | (4) | (5) | (6) | (7) | (8) | (9) | (10) | (11) |
|---|---|---|---|---|---|---|---|---|---|---|---|
| 90 Ethanol<br>10 DMF |  | X |  |  |  |  |  |  |  |  |  |
| 90 Ethanol<br>10 Methanol | X | X | X |  |  |  |  |  |  |  |  |
| 90 Ethanol<br>10 Water | X | X | X | X |  |  |  |  |  |  |  |
| Ethyl formamide | X | X | X |  |  |  |  |  |  |  | X |
| Ethylene glycol | X | X |  |  |  |  |  |  |  |  | X |
| 90 Ethylene glycol<br>10 DMF | X | X |  |  |  |  |  |  |  |  |  |
| 90 Ethylene glycol<br>10 Methanol | X | X |  |  |  |  |  |  |  |  | X |
| 90 Ethylene glycol<br>10 Water | X | X |  |  |  |  |  |  |  |  | X |
| Ethylene oxide |  | X | X |  |  |  |  | X |  |  |  |
| Glycerol | X |  |  |  |  |  |  |  |  |  | X |
| 80 Hexane<br>20 Methanol |  |  |  |  |  |  |  |  |  | X |  |
| 90 Isopropanol<br>10 Water |  | X |  |  |  |  |  |  |  |  |  |
| 90 Metaxylene<br>10 Methanol |  |  |  |  |  |  |  |  |  | X |  |
| Methanol | X | X | X | X |  |  |  | X |  |  |  |
| 90 Methanol<br>10 DMF | X | X | X |  |  |  |  |  |  |  | X |
| Methyl Cellosolve | X | X | X |  |  |  |  |  |  |  |  |

TABLE I-continued

| % Solvent A<br>% Solvent B | (1) | (2) | (3) | (4) | (5) | (6) | (7) | (8) | (9) | (10) | (11) |
|---|---|---|---|---|---|---|---|---|---|---|---|
| n-methyl-2-pyrrolidone | | | X | | | | | | | | |
| 90 Mineral spirits<br>10 Methanol | | | | | | | | X | | X | |
| Nitrobenzene | | X | | | | | | | | | |
| 90 Nitrobenzene<br>10 DMF | | X | | | | | | | | | |
| 90 Nitrobenzene<br>10 Methanol | | X | | | | | | | | | |
| Phenyl acetate | | | X | | | | | | | | |
| 90 Diacetone alcohol<br>10 Water | | X | X | | X | | | | | | |
| Diethyl acetamide | | X | X | | | | | | | | |
| Diethyl formamide | | X | X | | X | | | X | | | |
| 90 Diethyl formamide<br>10 DMF | | X | X | | X | | | X | | | |
| 90 Diethyl formamide<br>10 Methanol | | X | X | | X | | | X | | | |
| Diethylene glycol | X | X | X | | | | | | | | |
| Dimethyl acetamide | | X | X | | | | | X | | | |
| 1,4-Dioxane | | | X | | | | | | | X | |
| Dipropyl sulfone | | X | X | | | | | X | | X | |
| Dimethyl formamide (DMF) | X | X | X | | | | | X | X | X | |
| 95 DMF<br>5 Ethylene glycol | | X | X | | | | | | | | |
| 90 DMF<br>10 Methanol | X | X | X | | | | | X | X | X | |
| 90 DMF<br>10 Water | | X | | | | | | | X | | |
| 50 DMF<br>50 Acetone | | X | X | | | | | | | | |
| 50 DMF<br>50 Toluene | | | X | | | | | | | | |
| Dimethyl sulfoxide (DMSO) | X | X | X | X | X | | X | | X | X | |
| 90 DMSO<br>10 DMF | X | X | X | | | | | | | X | |
| 90 DMSO<br>10 Methanol | | X | X | | | | | | | | |
| 90 DMSO<br>10 Water | | X | | | | | | | | | |
| Ethanol | X | X | X | | X | | | | | | |
| 95 Ethanol<br>5 Ethylene glycol | X | X | X | | | | | | | | |
| 90 Ethanol<br>10 Ethylene glycol | X | X | X | | | | | | | | |
| 90 Acetone<br>10 Methanol | | X | X | | X | | | | | | |
| 80 Acetone<br>20 Methanol | | X | X | | X | | | | | | |
| 90 Acetone<br>10 Water | | X | X | | X | | | | | | |
| 80 Acetone<br>20 Water | X | X | X | | X | | | | | | |
| Acetonitrile | X | X | X | | | | X | | | | |
| 95 Acetonitrile<br>5 Ethylene glycol | X | X | X | X | X | | X | | | | |
| 90 Acetonitrile<br>10 DMF | | X | | | X | | | | | | |
| 90 Acetonitrile<br>10 Methanol | X | X | X | | X | | | | | | |
| 90 Acetonitrile<br>10 Water | X | X | X | X | X | | X | X | X | X | |
| Acetyl acetone | | X | X | | | | | | | | |
| Acrylonitrile | | X | X | | | | | | | | |
| Aniline | | X | X | | | | | | | | |
| Benzonitrile | | X | X | | | | | X | | X | |
| Benzyl alcohol | X | X | | | | | | | | | |
| Butyl Carbitol | | | X | | | | | | | | |
| Butyl Cellosolve | | | X | | | | | | | | |
| Butyrol acetone | X | | X | | | | | | | | |
| Butyrolactone | X | X | X | | | | | | | | |
| 70 Carbitol<br>30 Methanol | | X | | | | | | | | | |
| 90 Carbon tetrachloride | | | | | | | | | | | |

TABLE I-continued

| % Solvent A<br>% Solvent B | (1) | (2) | (3) | (4) | (5) | (6) | (7) | (8) | (9) | (10) | (11) |
|---|---|---|---|---|---|---|---|---|---|---|---|
| 10 Methanol |  | X | X |  |  |  |  |  |  | X |  |
| Diacetone alcohol |  | X | X |  |  |  |  |  |  |  |  |
| 90 Diacetone alcohol<br>10 DMF |  |  | X |  |  |  |  |  |  |  |  |
| 90 Diacetone alcohol<br>10 Ethylene alcohol |  | X | X |  |  |  |  |  |  |  |  |
| 90 Diacetone alcohol<br>10 Methanol |  | X | X |  |  |  |  |  |  |  |  |
| n-propanol |  | X |  |  |  |  |  |  |  |  |  |
| 90 n-propanol<br>10 Water |  | X |  |  | X |  |  |  |  |  |  |
| Propiolactone | X | X | X |  |  |  |  |  |  |  |  |
| Propionitrile |  | X | X |  |  |  |  | X |  | X |  |
| Propylene glycol | X | X | X |  | X |  |  |  |  |  | X |
| 90 Propylene glycol<br>10 Methanol | X | X |  |  |  |  |  |  |  |  |  |
| 90 Propylene glycol<br>10 Water | X | X |  |  |  |  |  |  |  |  |  |
| Styrene | X | X | X |  |  |  |  |  |  | X |  |
| 90 Toluene<br>10 Ethanol |  |  |  |  |  |  |  |  |  | X |  |
| 90 Toluene<br>10 Methanol |  |  |  |  |  |  |  |  |  | X |  |
| Water | X | X |  | X | X | X | X |  | X | X | X |
| 90 Xylene<br>10 Methanol |  |  |  |  |  |  |  |  |  | X |  |
| 90 Orthoxylene<br>10 Methanol |  |  |  |  |  |  |  |  |  | X |  |
| 90 Paraxylene<br>10 Methanol |  |  |  |  |  |  |  |  |  | X |  |

(1) Diisopropanolamine
(2) Ethomeen (BASF-Wyandatte Corp)
(3) Di2 (ethyl hexyl) amine
(4) Triethanolamine
(5) Triamylamine
(6) Jeffamine D-1000 (Jefferson Chemical Company Inc.)
(7) b-Dimethylaminopropionitrite
(8) Armeen (Armak Industrial Chemical Division)
(9) Alamine 7D (Henkel Corporation)
(10) Dodecylamine
(11) Morpholine Long chain fatty acid or monovalent or polyvalent salt thereof can be used alone as an auxiliary rheological additive or in combination with the aforementioned colloidal amphoteric oxides. Although the manner by which the fatty acid or salt contributes to the rheology and stability of the composition has not been fully elucidated it is hypothesized that it may function as a hydrogen bonding agent or cross-linking agent.

The preferred long chain fatty acids are the higher aliphatic fatty acids having from 8 to 22 carbon atoms, more preferably from 10 to 20 carbon atoms, and especially preferably from 12 to 18 carbon atoms, and especially preferably from 12 to 18 carbon atoms, inclusive of the carbon atom of the carboxyl group of the fatty acid. The aliphatic radical may be saturated or unsaturated and may be straight or branched. Straight chain saturated fatty acids are preferred. Mixtures of fatty acids may be used, such as those derived from natural sources, such as tallow fatty acid, coco fatty acid, soya fatty acid, mixtures of these acids, etc. Stearic acid and mixed fatty acids, e.g. stearic acid/palmitic acid, are preferred.

When the free acid form of the fatty acid is used directly it will generally associate with any potassium and sodium ions to form the corresponding alkali metal fatty acid soap. However, the fatty acid salts may be directly added to the composition as sodium salt or potassium salt, or as a polyvalent metal salt, although the alkali metal salts of the fatty acids are preferred fatty acid salts.

The preferred polyvalent metals are the di- and tri- valent metals of Groups IIA, IIB and IIIB, such as magnesium, calcium, aluminum and zinc, although other polyvalent metals, including those of Groups IIIA, IVA, VA, IB, IVB, VB, VIB, VIIB and VIII of the Periodic Table of the Elements can also be used. Specific examples of such other polyvalent metals include Ti, Zr, V, Nb, Mn, Fe, Co, Ni, Cd, Sn, Sb, Bi, etc. Generally, the metals may be present in the divalent to pentavalent state. Preferably the metal salts are used in their higher oxidation states.

The amount of the fatty acid or fatty acid salt stabilizer and/or colloidal thickener to achieve the desired enhancement of physical stability will depend on such factors as the nature of the fatty acid or its salt, the nature and amount of the polymeric thickening agent, the nature and amount of the organic solvent and other ingredients, as well as the anticipated storage and shipping conditions.

Generally, however, amounts of the fatty acid or fatty acid salt stabilizing agents in the range of from 0.02 to 2%, preferably 0.04 to 1%, more preferably from 0.01 to 0.8%, especially preferably from 0.08 to 0.4%, provide a long term stability and absence of phase separation upon standing or during transport at both low and elevated temperatures as are required for commercially acceptable product.

A further means of improving the thickening of the polymeric solutions of the instant invention comprises using in combination with the neutralized anionic polymer an inorganic layered colloidal forming clay such as a laponite clay, a smectite clay or an attapulgite clay. The concentration of the clay in the instant composition is about 0.1 to about 10.0 wt. percent, more preferably about 0.2 to about 4 wt. percent.

Smectite clays include montmorillonite (bentonite), hectorite, smectite, saponite, and the like. Montmorillonite clays are preferred and are available under tradenames such as Thixogel (Registered trademark) No. 1 and Gelwhite (Registered Trademark) GP, H, etc., from Georgia Kaolin Company; and ECCAGUM (Registered Trademark) GP, H, etc., from Luthern Clay Products. Attapulgite clays include the materials commercially available under the tradename Attagel (Registered Trademark), i.e. Attagel 40, Attagel 50 and Attagel 150 from Engelhard Minerals and Chemicals Corporation. Mixtures of smectite and attapulgite types in weight ratios of 4:1 to 1:5 are also useful herein. Thickening or suspending agents of the foregoing types are well known in the art, being described, for example, in U.S. Pat. No. 3,985,668 referred to above.

The layered clay minerals suitable for use in the present invention belong to the geological classes of the smectites, the kaolins, the illites, the chlorites, the attapulgites and the mixed layer clays. Typical examples of specific clays belonging to these classes are:

smectites, e.g. montmorillonite, bentonite, pyrophyllite, hectorite, saponite, sauconite, nontronite, talc, beidellite, volchonskoite, vermiculite;

kaolins, e.g. kaolinite, dickite, nacrite, antigorite, anauxite, halloysite, indellite, chrysotile;

illites, e.g. bravaisite, muscovite, paragonite, phlogopite, biotite;

chlorites, e.g. corrensite, penninite, donbassite, sudoite, pennine, clinochlore;

attapulgites, e.g. sepiolite, polygorskyte;

mixed layer clays, e.g. allevardite, vermiculitebiotite.

The layered clay minerals may be either naturally occurring or synthetic. Preferred clay minerals for use in the present invention are natural or synthetic hectorites, montmorillonites and bentonites, and of these the hectorites are especially preferred. Many of the above clays are commercially available, and typical examples of commercial hectorites are the Laponites from Laporte Industries Ltd, England; Veegum Pro and Veegum F from R. T. Vanderbilt, U.S.A.; the Barasyms, Macaloids and Propaloids from Baroid Division, National Lead Comp., U.S.A.

A useful procedure for producing the present gelled organic liquids comprises dissolving the anionic polymer in the organic solvent. This is usually accomplished with moderate mixing. The mixing is continued until there is a homogeneous solution. The auxiliary rheological additive, alone or as an aqueous or organic solution or dispersion, is then added to the solution of the anionic polymer. This is added with moderate mixing. An amphoteric oxide is added as a dispersion in water or an organic liquid. After the auxiliary rheological additive has been added and a homogeneous mixture formed, the amine is added to neutralize the polymer. During the initial addition, the homogenous mixture may thicken quickly and then become viscous. This can be expected. The amine is added while the homogenous mixture is being vigorously mixed. The resulting gelled organic liquid has very good thixotropic properties.

EXAMPLES 1-6

In this set of runs, Examples 1-3 are ethanol fuel gel compositions that contain a polyacrylic acid thickening agent but no alumina, while examples 4-6 are ethanol fuel gel compositions that contain a polyacrylic acid thickening agent and alumina. The polyacrylate polymer is B.F. Goodrich Carbopol 676 and the alumina is Dispal Alumina 23N4-80 available from the Vista Chemical Corporation.

The gelled ethanol compositions were prepared according to the following procedure. The Carbopol 676 polymer was slowly sieved (16 or 20 Mesh) and added into the ethanol with mixing at a temperature of about 25° C. and mixing was continued for fifteen minutes. A solution of the alumina was prepared by slowly adding with mixing the Dispal Alumina 23N4-80 and mixing was continued for about ten minutes. The diisopropanolamine was added with mixing at room temperature to the solution of water and Dispal 23N4-80 and mixing was continued for ten minutes. To the solution of the Carbopol 676 polymer and ethanol was quickly added with mixing the solution of the diisopropanolamine and the Dispal Alumina 23N4-80 and mixing was continued for two minutes.

The composition of the gelled ethanol are given in Table 2. The viscosity of the gelled ethanol is given in Table 3. The viscosity is a Brooksfield viscosity at 10 rpm with a spindle #7 at room temperature. It is seen that the alumina containing compositions have a higher initial and long time viscosity than non-alumina containing compositions. In addition, over time the alumina containing compositions maintain a higher viscosity compared to the compositions that do not contain alumina.

TABLE 2

| COMPONENTS | EXAMPLE | | | | | |
|---|---|---|---|---|---|---|
| | 1 | 2 | 3 | 4 | 5 | 6 |
| Polyacrylate Polymer | 0.75 | 0.65 | 0.55 | 0.75 | 0.65 | 0.55 |
| Ethanol | 71 | 71 | 71 | 71 | 71 | 71 |
| Water | 27.25 | 27.35 | 27.45 | 26.75 | 26.85 | 26.95 |
| Alumina | 0 | 0 | 0 | 0.5 | 0.5 | 0.5 |
| Diisopropanolamine | 1 | 1 | 1 | 1 | 1 | 1 |

TABLE 3

| DAYS | EXAMPLE | | | | | |
|---|---|---|---|---|---|---|
| | 1 | 2 | 3 | 4 | 5 | 6 |
| Initial | 86,000 | 76,000 | 68,000 | 116,800 | 103,600 | 89,200 |
| 1 | 86,400 | 76,000 | 71,200 | 131,600 | 116,400 | 92,000 |
| 2 | 87,200 | 81,200 | 63,200 | 136,400 | 120,000 | 102,800 |
| 7 | 86,400 | 84,000 | 76,400 | 130,000 | 126,000 | 113,600 |
| 14 | 90,000 | 90,400 | 78,000 | 134,000 | 127,200 | 116,000 |
| 28 | 93,200 | 89,200 | 82,000 | 132,000 | 126,400 | 110,400 |
| 42 | 94,000 | 96,000 | 84,000 | 130,000 | 132,400 | 110,400 |
| 56 | 81,600 | 93,600 | 78,000 | 128,400 | 125,600 | 126,000 |
| 84 | 104,000 | 89,200 | 81,600 | 159,600 | 132,000 | 128,000 |

EXAMPLES 7-12

In this set of runs, Examples 7-9 are methanol fuel gel compositions that contain a polyacrylate thickening agent but no alumina, while Examples 10-12 are methanol fuel gel compositions that contain a polyacrylate thickening agent and alumina. The polyacrylate polymer is B.F. Goodrich Carbopol 676 and the alumina is Dispal Alumina 23N4-80 available from Vista Chemical Corporation.

The gelled methanol compositions were prepared according to the following procedure. The Carbopol 676 polymer was slowly sieved (16 or 20 Mesh) and added into the methanol with mixing at a temperature of about 25° C. and mixing was continued for fifteen minutes. A solution of the alumina was prepared by slowly adding with mixing the Dispal Alumina 23N4-80 and mixing was continued for about ten minutes. The diisopropanolamine was added with mixing at room temperature to the solution of water and Dispal 23N4-80 and mixing was continued for ten minutes. To the solution of the Carbopol 676 polymer and methanol was quickly added with mixing the solution of the diisopropanolamine and the Dispal Alumina 23N4-80 and mixing was continued for two minutes.

The composition of the gelled methanol are given in Table 4. The viscosity of the gelled methanol is given in Table 5. The viscosity is a Brookfield viscosity at 10 rpm and a spindle #7 at room temperature. It is seen that the alumina containing compositions have a higher initial and long time viscosity than non-alumina containing compositions. In addition, over time the alumina containing compositions maintain a higher viscosity compared to the compositions that do not contain alumina.

TABLE 4

| COMPONENTS | EXAMPLE | | | | | |
|---|---|---|---|---|---|---|
| | 7 | 8 | 9 | 10 | 11 | 12 |
| Polyacrylate Polymer | .75 | .65 | .55 | .75 | .65 | .55 |
| Methanol | 72 | 72 | 72 | 72 | 72 | 72 |
| Water | 26.25 | 26.35 | 26.45 | 25.75 | 25.85 | 25.95 |
| Alumina | 0 | 0 | 0 | .5 | .5 | .5 |
| Diisopropanolamine | 1 | 1 | 1 | 1 | 1 | 1 |

TABLE 5

| DAYS | EXAMPLE | | | | | |
|---|---|---|---|---|---|---|
| | 7 | 8 | 9 | 10 | 11 | 12 |
| Initial | 82,400 | 73,200 | 60,000 | 100,400 | 97,600 | 66,000 |
| 1 | 94,000 | 79,200 | 58,000 | 118,800 | 114,400 | 84,800 |
| 2 | 87,200 | 84,000 | 64,800 | 132,000 | 127,600 | 106,000 |
| 7 | 98,400 | 79,200 | 71,200 | 136,000 | 117,600 | 80,000 |
| 14 | 91,600 | 91,600 | 76,400 | 124,000 | 112,000 | 112,000 |
| 28 | 84,400 | 80,000 | 70,400 | 144,000 | 132,000 | 116,800 |
| 42 | 92,400 | 86,800 | 81,600 | 156,800 | 137,600 | 92,000 |
| 56 | 94,400 | 77,200 | 79,600 | 144,000 | 134,800 | 109,200 |

EXAMPLE 13

The composition of Example 6 was prepared and filled into formed aluminum containers having an internal diameter of 8.64 cm and a height of 6.35 cm. The top opening is 5.08 cm. The average weight of gelled ethanol fuel is 221.7 g.

One container is placed under a chafing dish containing 3 liters of water at 43° C. in the water pan portion of the chafing dish and 2 liters of water 43° C. in the food pan. This container is ignited and from thermocouples in the water pan and food pan the temperatures of water in these pans are recorded. The averaged data for the runs is as follows:

| Burn Time | 131 minutes |
|---|---|
| Burn Rate | 1.49 g/min |
| Min To 65.5° C. Water Pan | 24.25 minutes |
| Min To 65.5° C. Food Pan | 54 minutes |
| Min To Max T° C. Water Pan | 122 minutes |
| Min To Max T°C. Food Pan | 129.75 minutes |
| Max T° C. Water Pan | 99.1° C. |
| Max T° C. Food Pan | 89.1° C. |

This example shows the canned fuels to have an acceptable burn time and temperature profile.

EXAMPLE 14

The fuels of Example 13 were tested for conformance with tested according to ASTM D 4359-84. The title of this test is "Determining Whether A Material Is A Liquid Or A Solid". The fuels are placed in quart cans and filled to at least the 85 percent (85%) level. The cans are sealed using friction lids and placed in an oven at 38° C.±3° C. for 24 hours. The cans are then removed from the oven and the lids removed. The cans are placed inverted in a stand for 3 minutes. The level of the gelled fuel in the can is measured at the start and end of the 3 minute period. A flow of 5 cm or less is acceptable and the material is considered to be a solid. The canned fuel samples that were tested. There was no flow. They are classified as solids under ASTM D 4359-84.

| | Example 15–36 | | | | | | | | | | |
|---|---|---|---|---|---|---|---|---|---|---|---|
| | 15 | 16 | 17 | 18 | 19 | 20 | 21 | 22 | 23 | 24 | 25 |
| Carbopol 676 | 0.85 | 0.85 | 0.85 | 0.75 | 0.75 | 0.65 | 0.65 | 0.55 | 0.55 | 0.45 | 0.45 |
| Diisopropanolamine 85% | 0.35 | 0 | — | 1.0 | 1.0 | 1.0 | 1.0 | 1.0 | 1.0 | 1.0 | 1.0 |
| NaOH 50% | — | 0.08 | 0.5 | — | — | — | — | — | — | — | — |
| Almina(Dispal 23N4-80 | 0 | 0 | — | 0 | 0.5 | 0 | 0.5 | 0 | 0.5 | 0 | 0.5 |
| D.I. Water | 27.8 | 28.07 | 28.10 | 27.25 | 26.75 | 27.35 | 26.85 | 27.45 | 26.95 | 27.55 | 27.05 |
| Methanol 95% | 71 | 71 | 71 | 71 | 71 | 71 | 71 | 71 | 71 | 71 | 71 |
| Initial Brookfield Viscosity #7 Spindle, 10 rpm RT (cPs) | 86000 | 31600 | 34000 | 86000 | 116800 | 76000 | 103600 | 68000 | 89200 | 5000 | 59600 |

| | Example 15–36 | | | | | | | | | | |
|---|---|---|---|---|---|---|---|---|---|---|---|
| | 26 | 27 | 28 | 29 | 30 | 31 | 32 | 33 | 34 | 35 | 36 |
| Carbopol 676 | 0.75 | 0.75 | 0.65 | 0.65 | 0.55 | 0.55 | 0.45 | 0.45 | 0.45 | 0.45 | 0.35 |
| Diisopropanolamine 85% | 1.0 | 1.0 | 1.0 | 1.0 | 1.0 | 1.0 | 0.75 | 0.75 | 1.0 | 1.0 | 0.65 |
| NaOH | — | — | — | — | — | — | — | — | — | — | — |
| Almina(Dispal 23N4-80 | 0 | 0.5 | 0 | 0.5 | 0 | 0.5 | 0 | 0.5 | 0 | 0.5 | 0.5 |
| D.I. Water | 26.25 | 25.75 | 26.35 | 25.85 | 26.35 | 25.85 | 26.80 | 26.30 | 26.55 | 26.05 | 26.5 |
| Methanol 100% | 72 | 72 | 72 | 72 | 72 | 72 | 72 | 72 | 72 | 72 | 72 |
| Initial Brookfield Viscosity #7 Spindle, 10 rpm RT (cPs) | 82400 | 100400 | 73200 | 97600 | 60000 | 66000 | 45200 | 40400 | 45200 | 57200 | 33200 |

EXAMPLES 15–36

The formulas (15–36) were prepared according to the following procedure. The Carbopol 676 polymer was slowly sieved (16 or 20 Mesh) and added into the methanol or ethanol with mixing at a temperature of about 25° C. and mixing was continued for fifteen minutes. A solution of the alumina was prepared by slowly adding with mixing the Dispal Alumina 23N4-80 and mixing was continued for about ten minutes. The diisopropanolamine was added with mixing at room temperature to the solution of water and Dispal 23N4-80 and mixing was continued for ten minutes. To the solution of the Carbopol 676 polymer and methanol (or ethanol) was quickly added with mixing the solution of the diisopropanolamine and the Dispal Alumina 23N4-80 and mixing was continued for two minutes. The Brookfield viscosities were run at room temperature using a #7 spindle at 10 rpms.

EXAMPLE 37

The Complex Viscosities (Pa.s), the Storage Moduli G'(N/m$^2$), and the Loss Moduli G" (N/m$^2$) of Compositions at 150 micro N.m and 10 rad/s (Strain Sweep Experiment) were obtained. Methanol (34)=0.45% Carbopol, Methanol (35)= 0.45% Carbopol plus 0.5% Alumina, Ethanol (24)=0.45% Carbopol, and Ethanol (25)=0.45% Carbopol plus 0.5% Alumina.

| | Ethanol (24) | Ethanol (25) | Methanol (34) | Methanol (35) |
|---|---|---|---|---|
| Complex Viscosity (Pa · s) | 40.13 | 52 | 39.10 | 75.28 |
| G' (N/m$^2$) | 398.9 | 517.6 | 389.2 | 750.6 |
| G" (N/m$^2$) | 44.58 | 49.48 | 37.64 | 57.79 |
| Yield Stress N/m$^2$ | 85.53 | 124.6 | 87.37 | 91.08 |

Pa = NM$^{-2}$ 39.10 Pa · s = 391.0 dyne · cm$^{-2}$,
N/m$^2$ 389.2 N/m$^2$ = 3892 dyne · cm$^{-2}$

What is claimed is:

1. A polymeric gel having increased viscosity provided by an auxiliary rheological additive comprising approximately by weight:
   (a) 0.1 to 10.0 weight percent of an anionic polymer at least partially neutralized through the addition of at least one organic base to neutralize said anionic polymer and to form a gel; and
   (b) 0.1 to 10.0 percent by weight of an amphoteric oxide auxiliary rheological additive; and
   (c) the balance being at least one predominantly organic solvent wherein the viscosity of the polymeric gel is increased from about 10 to 300 percent of the viscosity of a similar gel which does not contain the auxiliary rheological additive, said polymeric gel having a viscosity of 33,200 cps and greater and flows less than 5 cm when said polymeric gel is heated to 38° C.±3° C. for 24 hours and the container holding said polymeric gel is inverted for three minutes.

2. A polymer gel as in claim 1 wherein said at least one organic base is an amine.

3. A polymer gel as in claim 2 wherein said solvent is a fuel.

4. A polymer gel as in claim 3 wherein said fuel is selected from the group consisting of alkanes, alkenes, alcohols of from 1 to 6 carbon atoms, aromatic hydrocarbons and mixtures thereof.

5. A polymeric gel as in claim 1 wherein the amphoteric oxide is alumina.

6. A polymer gel as in claim 1 wherein said solvent is a fuel.

7. A polymer gel as in claim 6 wherein said fuel is selected from the group consisting of alkanes, alkenes, alcohols of from 1 to 6 carbon atoms, aromatic hydrocarbons and mixtures thereof.

8. A polymer gel as in claim 7 wherein said alcohol is selected from the group consisting of methanol, ethanol and mixtures thereof.

9. A polymeric gel having increased viscosity provided by an auxiliary rheological additive comprising approximately by weight:
   (a) 0.1 to 10.0 weight percent of an anionic polymer at least partially neutralized through the addition of at least one organic base to neutralize said anionic polymer and to form a gel; and
   (b) 0.1 to 10.0 percent by weight of an amphoteric oxide auxiliary rheological additive; and (c) the balance being at least one predominantly organic solvent wherein the viscosity of the polymeric gel is increased from about 10 to 300 percent of the viscosity of a similar gel which does not contain the auxiliary rheological additive, said polymeric gel having a viscosity of 33,200 cps and greater.

10. A polymer gel as in claim 9 wherein said amphoteric oxide is alumina.

11. A polymeric gel as in claim 9 wherein said at least one organic base is an amine.

12. A polymeric gel as in claim 9 wherein said solvent is a fuel.

13. A polymeric gel as in claim 12 wherein said fuel is selected from the group consisting of alkanes, alkenes, alcohols of from 1 to 6 carbon atoms, aromatic hydrocarbons and mixtures thereof.

14. A polymeric gel as in claim 13 wherein said alcohol is selected from the group consisting of methanol, ethanol and mixtures thereof.

15. A polymeric gel having increased viscosity provided by an auxiliary rheological additive comprising approximately by weight:

(a) 0.1 to 10.0 weight percent of an anionic polymer at least partially neutralized through the addition of at least one organic base to neutralize said anionic polymer and to form a gel; and (b) 0.1 to 10.0 percent by weight of an amphoteric oxide auxiliary rheological additive; and (c) the balance being at least one predominantly organic solvent wherein the viscosity of the polymeric gel is increased from about 10 to 300 percent of the viscosity of a similar gel which does not contain the auxiliary rheological additive, said polymeric gel flows less than 5 cm when said polymeric gel is heated to 38° C.±3° C. for 24 hours and the container holding said polymeric gel is inverted for three minutes.

16. A polymeric gel as in claim 15 wherein said at least one organic base is an amine.

17. A polymeric gel as in claim 15 wherein said amphoteric oxide is alumina.

18. A polymeric gel as in claim 15 wherein said solvent is a fuel.

19. A polymeric gel as in claim 18 wherein said fuel is selected from the group consisting of alkanes, alkenes, alcohols of from 1 to 6 carbon atoms, aromatic hydrocarbons and mixtures thereof.

20. A polymeric gel as in claim 19 wherein said alcohol is selected from the group consisting of methanol, ethanol and mixtures thereof.

* * * * *